United States Patent [19]

Wolf et al.

[11] Patent Number: 4,803,344
[45] Date of Patent: Feb. 7, 1989

[54] APPARATUS AND PROCESS FOR CONTROLLING THE SIMMERING OR COOKING TIME IN A COOKING VESSEL

[75] Inventors: Kurt Wolf; Wolfram K. Andre, both of Wildbad, Fed. Rep. of Germany

[73] Assignee: Fissler GmbH, Fed. Rep. of Germany

[21] Appl. No.: 130,784

[22] Filed: Dec. 9, 1987

[30] Foreign Application Priority Data

Dec. 10, 1987 [DE] Fed. Rep. of Germany ....... 3642181

[51] Int. Cl.$^4$ ............................................. H05B 1/02
[52] U.S. Cl. ..................... 219/497; 219/492; 219/508; 426/243; 426/510; 340/589; 99/328; 99/330
[58] Field of Search ............... 219/490, 491, 494, 497, 219/492, 501, 508, 506, 509, 440; 426/234, 243, 510, 523; 99/327, 328, 330, 332, 335; 340/588, 589

[56] References Cited

U.S. PATENT DOCUMENTS

| | | | |
|---|---|---|---|
| 4,535,229 | 8/1985 | Wolf et al. | 219/440 |
| 4,541,733 | 9/1985 | Andre | 374/149 |
| 4,574,184 | 3/1986 | Wolf et al. | 219/440 |
| 4,585,925 | 4/1986 | Andre | 219/497 |
| 4,587,405 | 5/1986 | Andre | 219/491 |
| 4,587,406 | 5/1986 | Andre | 219/497 |
| 4,608,260 | 8/1986 | Andre | 426/233 |
| 4,614,441 | 9/1986 | Wolf | 374/130 |
| 4,620,083 | 10/1986 | Andre | 219/491 |
| 4,629,852 | 12/1986 | Andre | 219/497 |
| 4,682,012 | 7/1987 | Wolf et al. | 219/490 |
| 4,682,013 | 7/1987 | Andre et al. | 219/497 |
| 4,682,298 | 7/1987 | Andre | 364/557 |
| 4,700,052 | 10/1987 | Wolf et al. | 219/497 |

FOREIGN PATENT DOCUMENTS

| | | |
|---|---|---|
| 2932039 | 2/1981 | Fed. Rep. of Germany . |
| 2949890 | 6/1981 | Fed. Rep. of Germany . |
| 3314398 | 10/1984 | Fed. Rep. of Germany . |
| 3316799 | 11/1984 | Fed. Rep. of Germany . |
| 3323399 | 1/1985 | Fed. Rep. of Germany . |
| 2951434 | 9/1986 | Fed. Rep. of Germany . |
| 3642181 | 4/1988 | Fed. Rep. of Germany . |

Primary Examiner—M. H. Paschall
Attorney, Agent, or Firm—Thomas W. Speckman

[57] ABSTRACT

This invention relates to controlling the simmering or cooking time in a cooking vessel which can be heated by means of an electrical cooking plate with a control circuit, in which the temperature in or on the cooking vessel is determined and utilized by the control circuit to regulate the heat output of the cooking plate, in which the simmering or cooking time can be set by means of an adjustable time element, in which the cooking plate can be shut off at a length of time bvefore the completion of the predetermined simmering or cooking time which is greater the slower that the rise of the temperature in the heating phase is, and in which, by using the heat content contained inthe cooking material after shutting off the cooking plate the simmering or cooking process is extended up to the preset simmering or cooking time. Starting temperatures which lie above room temperature distort the increase of the temperature in the heating phase, and thus the derivation of a measuring value initiating the premature switching off of the cooking plate. This invention provides for correcting the measure values in the heat phase in a predetermined manner so that the cooling process can nonetheless be determined.

20 Claims, 2 Drawing Sheets

APPARATUS AND PROCESS FOR CONTROLLING THE SIMMERING OR COOKING TIME IN A COOKING VESSEL

BACKGROUND OF THE INVENTION

1. Field of the Invention

This invention relates to controlling the simmering or cooking time in a cooking vessel which can be heated by means of an electrical cooking plate with a control circuit, in which the temperature in or on the cooking vessel is determined and utilized by the control circuit to regulate the heat output of the cooking plate, in which the simmering or cooking time can be set by means of an adjustable time element. The cooking plate can be shut off at a length of time before the completion of the predetermined simmering or cooking time, which shut off time difference is greater with the slower the rise of the temperature in the heating phase, and in which, by using the heat content contained in the cooking material when shutting off the cooking plate, the simmering or cooking process can be extended up to the preset simmering or cooking time.

2. Description of the Prior Art

German Patent Publication No. 33 14 398 teaches a device in which information is obtained from the rise in the temperature during the heating phase as to the quantity of preferably fluid cooking material is contained in the cooking vessel, and how, as a result, the cooling process proceeds after the cooking plate is switched off. In this manner, the cooling process can be utilized to extend the simmering or cooking time. In this system, it is to be considered that the simmering effect on the food is halved for approximately every 10° C. of reduction in temperature. It is therefore reasonable to only consider the secondary simmering after disconnecting the cooking plate up to the drop to approximately the boiling temperature of water with a steam pressure cooking pan in the pressure-free condition. The energy expenditure for the simmering or cooking process is thereby reduced to the minimum level, and an undesired extension of the simmering or cooking process by the cooling process is avoided. The simmering or cooking process set by the simmering or cooking time is thus maintained with regard to the quantity of cooking material in the cooking vessel and the cooling process which specifically arises.

German Patent Publication 33 16 799 teaches a device for a steam pressure cooking pan, in which the time period for attaining the temperature necessary for initiating significant steam formation is utilized up to reaching of the boiling temperature of the water, in order to obtain information as to how great the quantity of preferably solid cooking material is above the water bath. With an increasing quantity of cooking material, this time period correspondingly increases, and the heat quantity stored in the cooking material, rises correspondingly, so that the cooking plate can be correspondingly shut off in advance. The predetermined simmering or cooking time is correspondingly extended into the cooling phase, and thus maintained. With increasing time length, the disconnection of the cooking plate can thus be initiated correspondingly earlier.

It is also known to utilize both the increase of the temperature in the heating phase, as well as the time period which extends from the reaching of the temperature necessary for the initiation of significant steam formation up to the reaching of the boiling temperature of the water, in a device for the early switching off of the cooking plate, as German Patent Publication 33 23 399 demonstrates. In this system, the time span for shortening the on time of the cooking plate is derived from both forms of information. With a predetermined maximum increase of the temperature in the heating phase, only the predetermined time period for deriving the time period is utilized.

It has been shown that even when determining the increase of the temperature during the heating phase, false measurements are obtained if, when turning on the cooking plate, the starting temperature of the cooking material lies above room temperature. The increase in the temperature during the temperature measurement time changes with the same quantity of cooking material in dependence on the starting temperature. With increasing starting temperature, the increase in the temperature of the quantity of cooking material is therefore misrepresented, and the derived shortened time span is thereby too great. The consequence of this is that the cooling process is too short and that, with the premature switching off the cooking plate, the cooling phase is not sufficient to maintain the simmering or cooking time long enough for the predetermined simmering or cooking time to be reached. Higher starting temperatures are, however, frequently present. There should only be recalled the thorough searing of food in the cooking vessel. In this case, the cooking vessel is heated, and the food is then, for example, spoiled by the hot sludge.

SUMMARY OF THE INVENTION

It is an object of this invention to provide a device of the type stated above in which, even with higher starting temperatures than room temperature, when the cooking plate is switched on, the increase of the temperature in the temperature measuring time in the heating phase can be so determined that it contains information about the quantity of cooking material in the cooking vessel, and thereby ascertain the cooling process to be expected upon premature disconnection of the cooking plate.

This object is achieved in accordance with the invention in that the rate of increase of temperature is determined in a temperature measuring range slightly below the temperature necessary for initiating a significant steam formation from a measuring cycle with "n" successive measured values. When the cooking plate is switched on, the starting temperature is measured and with a starting temperature lower than a lower temperature boundary value, the increase of the temperature is only determined from the "k" measuring values with the sharpest increases in the temperature. With a starting temperature higher than the lower temperature boundary value, but lower than an upper temperature boundary value, the increase of the temperature is determined from the "m" measuring value with the most rapid increase of the temperature, whereby "m" is less than "k" and "k" is less than "n". When the starting temperature is greater than the upper temperature boundary value, the time period from reaching the boiling temperature of the water up to reaching a predetermined measuring temperature slightly above the boiling temperature is measured and the time period for the premature switching off of the cooking plate is derived from the thus corrected increase of the temperature or the measured time period, whereby the time period is the greater the slower the corrected rise of the temperature, or the greater the time period.

Through the displacement of the temperature measuring range into the range directly below the temperature necessary for initiating significant steam formation, a correction of the increase of the temperature in the heating phase can be undertaken almost up to the temperature measuring range. The measuring values thus obtained for the increases allows the quantity of cooking material to be determined, and can be utilized for ascertaining the time period for the shortening of the switch-on time of the cooking plate. If the starting temperature surpasses the upper temperature boundary value, then the shortening time period is derived from the time period which extends from the reaching of the boiling temperature of the water up to the reaching of the predetermined measuring temperature. The measuring temperature of approximately 104° C. is selected, since, directly after reaching the boiling temperature of the water, the additional temperature increase with a switched-on cooking plate contains information which gives information about the quantity of the heated cooking material, and can thus be utilized for the premature switching off of the cooking plate. During the bio-simmering, this measuring temperature can coincide with the selected refining or cooking temperature. In this manner, it is ensured that the heat quantity contained in the cooking material even at starting temperatures above room temperature can be used with adequate precision for determining the premature switching off of the cooking plate and the extension of the simmering or cooking process.

In accordance with one embodiment, the device is so constructed that the measuring cycle is divided into three temperature ranges of $Tm1=65°$ C. to $Tm2=70°$ C.; from $Tm2=70°$ to $Tm3=80°$ C.; and from $Tm3=80°$ C. to $Tm4=85°$ C.; and the times necessary for traversing these temperature ranges are measured as criteria for the increase of the temperature in these amounts, whereby, for the corrected increases, the $k=2$ or $m=1$ of the smallest measuring times of the measuring cycle is used for deriving the time period. In this manner, the measuring points can be easily predetermined and the increases of the temperature in the measuring cycle can be determined as measuring times.

If, in accordance with another embodiment, it is provided that, upon dropping below a minimum value of the measuring time in the measuring cycle, the determined increase with the derivation of the time period remains unconsidered, and the time period is greater which then extends from the reaching of the temperature necessary for the initiation of significant steam formation to the reaching of the boiling temperature of the water, then the influence of the material used as a water bath is no longer considered in the derivation of the time period, and the time period is only dependent on the quantity of the cooking material in the steaming space.

In order to obtain defined points for the beginning and the end of the simmering or cooking process, one additional embodiment of the device provides that the measuring of the simmering or cooking time begins with the reaching of approximately the simmering or cooking temperature, and ends in the cooling phase by falling below approximately the boiling temperature.

If the increases of the temperature in the heating phase are determined precisely as are the time periods from reaching the boiling temperature of the water up to the reaching of the simmering or cooking temperatures, then the derivation for the time period to the premature switching off of the cooking plate is simplified through the fact that, with a starting temperature below the lower temperature boundary value, the time period is the sum of the added measuring times of the 'k' measuring values, and with a starting temperature greater than the lower temperature boundary values, is correspondingly smaller than the upper temperature boundary value of the doubled measuring time from the "m" measuring values, and that, with a starting temperature greater than the upper temperature boundary value, the time period corresponds to the time period from reaching the boiling temperature up to the reaching of the measuring temperature.

BRIEF DESCRIPTION OF THE DRAWING

The invention will now be illustrated in greater detail by means of drawings wherein.

DESCRIPTION OF PREFERRED EMBODIMENTS

Figure 1:
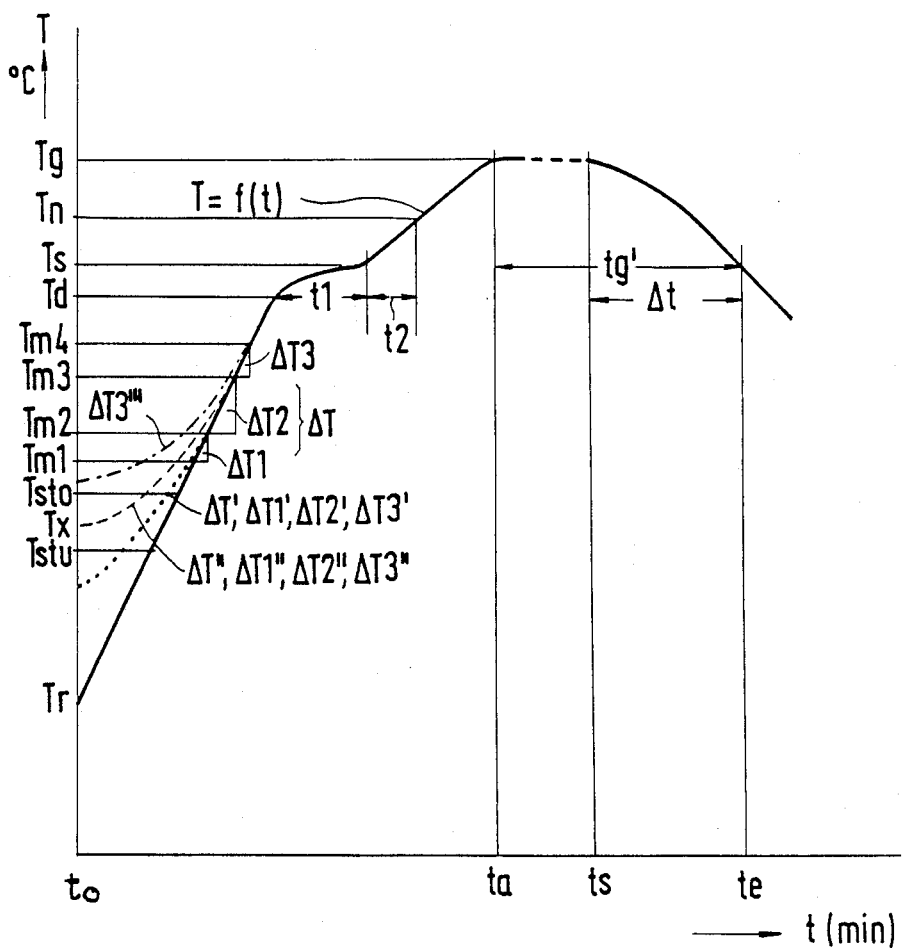
FIG. 1 is a temperature/time curve in a simmering or cooking process according to this invention.

FIG. 1 shows the temperature/time curve $T=f(t)$ in the simmering or cooking process. At the time point $t=0$, the device is switched on, and the cooking plate heats the cooking vessel placed on it with its contents. The temperature is measured in or on the cooking vessel. The solid line shows the temperature/time curve with a starting temperature which corresponds to the room temperature Tr. The increase of the curve takes place generally linearly up to a temperature Td, at which point a significant steam formation takes place. This temperature amounts to approximately 90° to 92° C. It then proceeds for a time period t1, until the temperature has reached the boiling temperature Ts of the water. The additional increase above the boiling temperature Ts of the water up to the selected measuring temperature Tn of about 104° C. then takes place again generally linearly, and requires the time period t2. If the simmering or cooking temperature Tg of the water is attained, the measurement of the predetermined simmering or cooking time tg begins at the time point ta. If the cooking plate is switched off at the time point ts, then the cooling process follows, which, depending on the heat content of the cooking material, the cooking vessel, and the cooking plate, lasts for greater or lesser time, until the temperature has again fallen to the boiling temperature Ts of the water. This part of the cooling phase is signified by time period $\Delta t$ and is so selected that, upon premature switching off of the cooking plate from the time point ts, a simmering or cooking process proceeds to the time point te, which, as regards to the measured time segments, corresponds to the cooling phase of the preselected simmering or cooking time tg.

Since this time period $\Delta t$ of the cooling phase is dependent on the heat content of the system during the premature switching off of the cooking plate, information about the inertia of the system may be obtained in the heating phase. The increase of the temperature in the heating phase is a first criterion which can give information about the inertia of the system. In addition, in the temperature measuring range from $Tm1=65°$ C. to $Tm4=85°$ C. determined in three measurements of a measuring cycle, the value $\Delta t$ is determined from the three measured values ΔT1, ΔT2, and ΔT3. The individual ranges thereby extend from Tm1=65° C. to Tm2=70° C., from Tm2=70° to Tm3=80° C., and from Tm3=80° C. to Tm4=85° C. If the starting temperature is equal to the room temperature Tr, then all three measurements provide an equal rate of increase of the temperature. If, however, the simmering or cooking process begins at a higher starting temperature, which lies between room temperature Tr and a lower temperature boundary value Tstu, then the starting section of the temperature/time curve represented in dots shows that, in the temperature measuring range Tml to Tm2, the rate of increase of ΔT1' already diverges from the increases ΔT2' and ΔT3' of the temperature measuring ranges Tm2 to Tm3, and Tm3 to Tm4. In determining the increase ΔT' decisively corrected for the inertia of the system, the value ΔT1' thus remains unconsidered. If the starting temperature Tx lies between the lower temperature boundary range Tstu of approximately 50° C. and an upper temperature boundary value Tsto of approximately 60° C., then the starting portion of the temperature/time curve shows that only the measuring value ΔT3'' still corresponds to the original rate of increase, which is decisive for the inertia of the system in the cooling phase. In this starting range, only the measuring value ΔT3'' is used to derive a corrected increase ΔT''. If the starting temperature lies above the upper temperature boundary value Tsto, then a corrected increase ΔT'''' can no longer be derived, since all measuring values ΔT1''', ΔT2''', and ΔT3''' diverge from the original curve. For this case, these increases of temperature give no further indication to the inertia of the system during the cooling process. In this case, the time period Δt is derived from the time period t2. The time period t2 is determined between reaching of the boiling temperature Ts of the water up to reaching the predetermined measuring temperature Tn about 104° C. When the time period t2 becomes greater, the time period Δt also increases generally proportionately. The characteristics for the system can be determined once and fed into the control circuit for the cooking plate.

If, in a cooking vessel constructed as a steam pressure cooking pot, only a little water is contained as a water bath for producing steam, then the temperature/time curve in the heating phase rises very sharply. This water bath then has little influence on the cooling process. The cooking material maintained over the water bath in the steam space causes, on the contrary, a corresponding extension of the cooking process. This inertia can, however, be discerned and derived during the heating process, and specifically from the time period t1, which extends from reaching of the temperature necessary for initiating a significant steam formation Td of approximately 90° C. to 92° C. up to reaching of the boiling temperature Ts of the water, such as, for example, approximately 98° C. to 100° C. This time period t1 increases with the increasing heat content of the system, so that the time period Δt can also be selected to be correspondingly and proportionately greater. The dependence of the time period t1 upon the time period Δt is determined systemically, and is then fed into the control circuit.

For the sake of simplicity, in determining the corrected increases ΔT, ΔT', and ΔT'', the temperatures Tm1 to Tm4 are set, and the corresponding transversal times are measured with the corresponding partial measurement ranges as measuring times. These measuring times are short if the corresponding heat content f the system is low, and long if this heat content is great. The times determined can then be converted, through simple evaluation with a system factor, into the pertinent time period Δt.

With a starting temperature less than the lower temperature boundary value Tstu, only the measurement times determined for the temperature ranges Tm2 to Tm3 and Tm3 to Tm4, that is, for the increases ΔT2' and ΔT3', are added, and then converted into the corresponding time period Δt. If the starting temperature lies between the lower temperature boundary value Tstu and the upper temperature boundary value Tsto, then only the measuring time for the temperature range Tm3 to Tm4, that is, the increase ΔT3'', is determined and doubled, in order to obtain the time period Δt.

Figure 2:
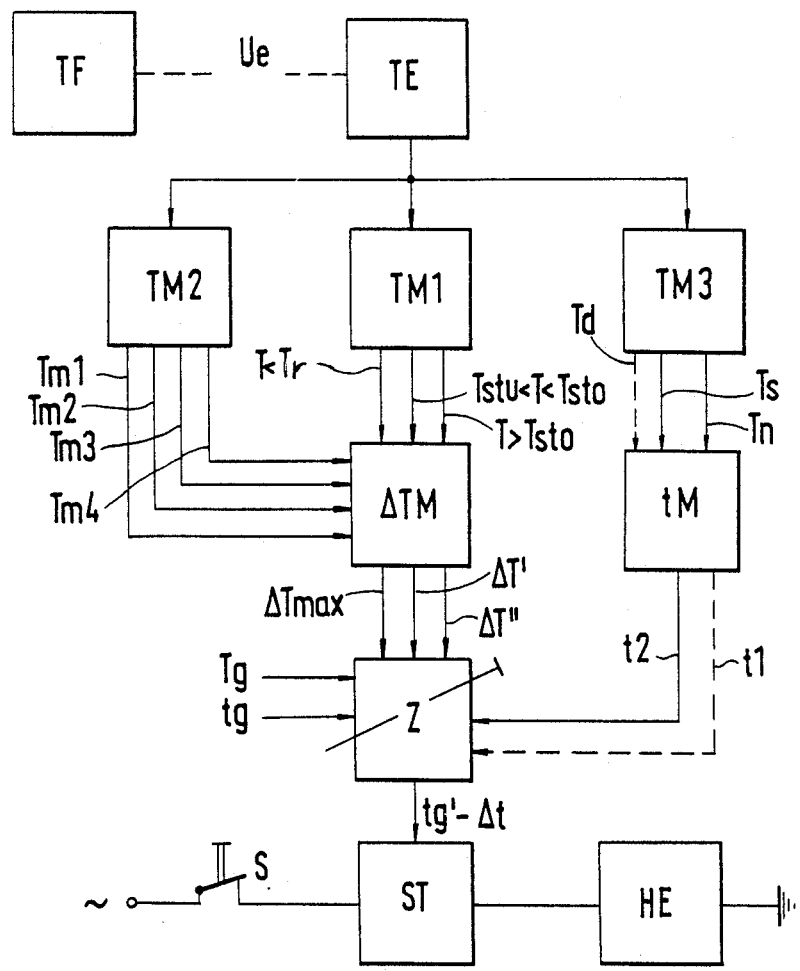
FIG. 2 is a simplified schematic circuit diagram of a device according to this invention.

FIG. 2 shows a device in schematic circuit diagram form. The temperature measuring sensor TF determines the temperature in or on the cooking vessel, and provides, over the transmission distances Ue, which can be either connected by wires or free from wires, corresponding electrical signals to the temperature receiver TE. Control signals can be derived for the determinable temperatures from the output signal of the temperature receiver TE. The temperature measuring circuit TM1 receives the output signal of the temperature receiver TE, and emits three output signals, which indicate whether the temperature present in or on the cooking vessel is lower than the room temperature Tr; higher than the lower temperature boundary value Tstu of 50° C. but lower than the higher temperature boundary value Tsto of 60° C.; or higher than the upper temperature boundary value Tsto of 60° C. The time measurement circuit TM2 emits control signals when the temperatures Tm1, Tm2, Tm3 and Tm4 of temperature measuring range are reached. These temperatures lie at Tm1=65° C., Tm2=70° C., Tm3=80° C. and Tm4=85° C., directly below the temperature Td of approximately 90° C. to 92° C., at which a significant steam formation initiates. Finally, a third temperature measuring circuit TM3 emits control signals when the temperature Td of approximately 90° C. to 92° C.; the boiling temperature Ts of the water of approximately 98° C. to 100° C.; and the preset measuring temperature Tn or approximately 104° C., are reached.

The time measuring circuits TM1 and TM2 control the adjustable time element Z, which is adjusted, before the simmering or cooking process, to the desired simmering or cooking time tg. The increase measuring circuit ΔTM receives, during the heating phase of the temperature measuring circuit TM1, a signal, which gives information about the starting temperature, when traversing the temperature measuring range from Tm1 to Tm4, in the increase circuit TM, which are determined for the individual ranges, the traversal times are determined as measuring times, and dependent on the starting temperatures determined, in order to obtain the corresponding time period Δt. As the control lines ΔT' and ΔT'' to the time element Z indicate, the increase as corrected time values are transmitted to the time element Z, and are subtracted in this from the set time. If the time element Z is set back, then, by means of the control circuit ST, the heating element HE of the cooking plate is switched off. The subsequent cooling process extends the refining or cooking during the time period Δt, so that, with regard to the simmering effect reduced in the cooling process, a simmering or cooking process is obtained which corresponds to the selected simmering or cooking time tg. The actual simmering or cooking time tg' is thus correspondingly greater than the preset simmering or cooking time tg in the time element Z.

If the starting temperature is greater than the upper temperature boundary value Tsto, then the increase measuring circuit ΔTM is blocked, so that no times are measured and evaluated in the temperature measuring range. The time period t2, which extends from the reaching of the preset measuring temperature Tn, is measured by means of the time measuring circuit tM. From this time period t2, a corresponding time period Δt is derived, and, in the time element Z subtracted from the set simmering or cooking time tg. The time period t2 provides, even at high starting temperatures, a criterion for the cooling process to be expected, and can, like the measuring times of the increase ΔT, be used for the premature switching off of the heating element HE. The time duration Δt is thereby derived with regard to the decreasing simmering effect up to the time point te, that is, the reaching of the boiling temperature Td in the cooling process.

If the temperature time curve rises very sharply in the heating phase, so that the increase, that is, the measuring times for the individual measuring ranges, falls below a predetermined value, then no significant range to the premature switching off of the heating element HE can be derived. The cooling process to be expected can then only be derived from the time period t1, which extends from the reaching of the temperature Td necessary for the initiation of the steam formation up to the reaching of the boiling temperature Ts of the water. As indicated in dashed form, the time measuring circuit tM passes one time period corresponding to the time period t1 to the time element Z for the subtraction from the preset simmering or cooking time. The output ΔTmax from the increase measuring circuit ΔTm indicates that no amount is to be expected for a premature switching off of the cooking plate from the increase of the temperature in the heating phase.

The switch S, by switching on, determines the beginning of the simmering or cooking process, and initiates the determination of the starting temperature by means of temperature measuring circuit TM1.

We claim:

1. An apparatus for controlling a simmering or cooking time in a cooking vessel which is heated by means of an electrical cooking plate with a control circuit, comprising:

means for measuring a starting temperature (Tx) upon switching on said cooking plate;

means for determining a rate of increase (ΔT) of a temperature (T) in each of a plurality of "n" successive temperature measuring ranges (Tml to Tmn) in a heating phase below the temperature (Td) necessary for initiating significant steam formation producing "n" successive measured values (ΔT, ΔT2, ΔTn);

means for measuring a rate of increase (ΔT') of said temperature (T) only determined from "k" measuring values, wherein "k" is less than "n", and has the steepest rate of increase in temperature rise when said starting temperature (Tx) is lower than a set lower temperature boundary value (Tstu);

means for measuring a rate of increase (ΔT") of said temperature (T) determined from "m" measuring values, wherein "m" is less than "k", when said starting temperature (Tx) is greater than said lower temperature boundary value (Tstu), but less than an upper temperature boundary value (Tsto);

means for measuring a time period (t2) from reaching a boiling temperature (Ts) of water up to the reaching of a predetermined measuring temperature (Tn) lying slightly above said boiling temperature (Ts) when said starting temperature (Tx) is greater than said upper temperature boundary value (tsto); and means for the premature switching off said cooking plate prior to a set cooking or simmering time a premature time period (Δt) derived from said rates of increase (ΔT, ΔT', ΔT") of said temperature (T) and said measured time period (t2), whereby said premature time period (Δt) is greater the slower said rates of increase (ΔT, ΔT', ΔT") of said temperature (T) and generally proportionately greater the longer said time period (t2).

2. An apparatus according to claim 1, wherein said successive temperature measuring ranges (Tml to Tmn) respectively range from about 65° to about 85° C.

3. An apparatus according to claim 2, wherein said lower temperature boundary value (Tstu) is about 50° C. and said upper temperature boundary value (Tsto) is about 60° C.

4. An apparatus according to claim 3, wherein said predetermined measuring temperature (Tn) is about 104° C.

5. An apparatus according to claim 4, wherein said successive temperature measuring ranges (Tml to Tmn) are subdivided into three temperature ranges from Tml=about 65° C. to Tm2=about 70° C.; form Tm2=about 70° C. to Tm3=about 80° C., and from Tm3=about 80° C. to Tm4=about 85° C., and that times necessary for traversing said successive temperature measuring ranges (Tml to Tmn) are measured as criteria for said rates of increases (ΔT', ΔT") of the temperature in the same, whereby, for said corrected rates of increase (ΔT', ΔT'), the k=2 or m=1 is the smallest measuring time of the measuring cycle for deriving said premature time period (Δt).

6. An apparatus according to claim 4, further comprising means for measuring a time period (t1) extending from the reaching of said temperature (Td) to the reaching of said boiling temperature (Ts) of water for determination of said premature time period (Δt) when falling short of a minimum value of a measuring time in a measuring cycle.

7. An apparatus according to claim 4, wherein said simmering or cooking time (tg) begins approximately upon reaching a simmering or cooking temperature (Tg) and ends upon falling below said boiling temperature (Ts) of water.

8. An apparatus according to claim 7, wherein with said starting temperature (Tx) bellow said lower temperature boundary value (Tstu) of about 50° C., said premature time period (Δt) corresponds to the sum of the added measuring times of said measuring values "k" where "k" equals 1, and with said starting temperature (Tx) greater than said lower temperature boundary value (Tstu) of about 50° C. and less than said upper temperature boundary value (Tsto) of about 60° C., said premature time period (Δt) corresponds to a doubled measuring time from said measuring value "m" where "m" equals 1.

9. An apparatus according to claim 8, wherein with said starting temperature (Tx) greater than said upper temperature boundary value (Tsto), said premature time period (Δt) corresponds to said time period (td) from reaching said boiling temperature (Ts), up to reaching said measuring temperature (Tn).

10. An apparatus according to claim 1, wherein said successive temperature measuring ranges (Tml to Tmn) are subdivided into three temperature ranges from Tm1=about 65° C. to Tm2=about 70° C.; from Tm2=about 70° C. to Tm3=about 80° C., and from Tm3=about 80° C. to Tm4=about 85° C., and that times necessary for traversing said successive temperature measuring ranges (Tml to Tmn) are measured as criteria for said rates of increase ($\Delta T'$, $\Delta T''$,) of the temperature in the same, whereby,, for said corrected rates of increase ($\Delta T'$, $\Delta T''$,), the k=2 or m=1 is the smallest measuring time of the measuring cycle for deriving said premature time period ($\Delta t$).

11. An apparatus according to claim 1, further comprising means for measuring a time period (t1) extending from the reaching of said temperature (Td) to the reaching of said boiling temperature (Ts) of water for determination of said premature time period ($\Delta t$) when falling short of a minimum value of a measuring time in a measuring cycle.

12. An apparatus according to claim 1, wherein said simmering or cooking time (tg) begins approximately upon reaching a simmering or cooking temperature (Tg) and ends upon falling below said boiling temperature (Ts) of the water.

13. An apparatus according to claim 1, wherein with said starting temperature (Tx) below said lower temperature boundary value (Tstu) of about 50° C., said premature time period ($\Delta t$) corresponds to the sum of the added measuring times of said measuring values "k" where "k" equals 1, and with said starting temperature (Tx) greater than said lower temperature boundary value (Tstu) of about 50° C. and less than said upper temperature boundary value (Tsto) of about 60° C., said premature time period ($\Delta t$) corresponds to a doubled measuring time from said measuring value "m" where "m" equals 1.

14. An apparatus according to claim 1, wherein with said starting temperature (Tx) greater than said upper temperature boundary value (Tsto), said premature time period ($\Delta t$) corresponds to said time period (t2) from reaching said boiling temperature (Ts), up to reaching said measuring temperature (Tn).

15. A process for controlling a simmering or cooking time in a cooking vessel which is heated by means of an electrical cooking plate with a control circuit, comprising:
  measuring a starting temperature (Tx) upon switching on said cooking plate;
  determining a rate of increase ($\Delta T$) of a temperature (T) in each of a plurality of "n" successive temperature measuring ranges (Tml to Tmn) in a heating phase below the temperature (Td) necessary for initiating significant steam formation producing "n" successive measured values ($\Delta T1$, $\Delta T2$, $\Delta Tn$);
  measuring a rate of increase ($\Delta T$,) of said temperature (T) only determined from "k" measuring values, wherein "k" is less than "n", and has the steepest increase in temperature rise when said starting temperature (Tx), is lower than a set lower temperature boundary value (Tstu);
  measuring a rate of increase ($\Delta T''$) of said temperature (T) determined from "m" measuring values, wherein "m" is less than "k", when said starting temperature (Tx) is greater than said lower temperature boundary value (Tstu), but less than an upper temperature boundary value (Tsto);
  measuring a time period (t2) from reaching a boiling temperature (Ts) of water up to the reaching of a predetermined measuring temperature (Tn) lying slightly above said boiling temperature (Ts) when said starting temperature (Tx) is greater than said upper temperature boundary value (Tsto); and
  prematurely switching off said cooking plate prior to a set cooking or simmering time a premature time period ($\Delta t$) derived from said rates of increase ($\Delta T$, $\Delta T'$, $\Delta T''$) of said temperature (T) and said measured time period (t2), whereby said premature time period ($\Delta t$) is greater the slower said rates of increase ($\Delta T$, $\Delta T'$, $\Delta T''$) of said temperature (T) and generally proportionately greater the longer said time period (t2).

16. A process according to claim 15, wherein said successive temperature measuring ranges (Tml to Tmn) respectively range from about 65° to about 85° C.; said lower temperature boundary value (Tstu) is about 50° C. and said upper temperature boundary value (Tsto) is about 60° C.; and said predetermined measuring temperature (Tn) is about 104° C.

17. A process according to claim 15, wherein said successive temperature measuring ranges (Tml to Tmn) are subdivided into three temperature ranges from Tm1=about 65° C. to Tm2=about 70° C.; from Tm2=about 70° C. to Tm3=about 80° C., and from Tm3=about 80° C. to Tm4=about 85° C., and that times necessary for traversing said successive temperature measuring ranges (Tml to Tmn) are measured as criteria for said rates of increase ($\Delta T'$, $\Delta T''$) of the temperature in the same, whereby, for said corrected rates of increase ($\Delta T'$, $\Delta T''$), the k=2 or m=1 is the smallest measuring time of the measuring cycle for deriving said premature time period ($\Delta t$).

18. A process according to claim 15, additionally comprising measuring a time period (t1) extending from the reaching of said temperature (Td) to the reaching of said boiling temperature (Ts) of water for determination of said premature time period ($\Delta t$) when falling short of a minimum value of a measuring time in a measuring cycle.

19. An apparatus according to claim 15, wherein with said starting temperature (Tx) below said lower temperature boundary value (Tstu) of about 50° C., said premature time period ($\Delta t$) corresponds to the sum of the added measuring times of said measuring values "k" where "k" equals 1, and with said starting temperature (Tx), greater than said lower temperature boundary value (Tstu) of about 50° C. and less than said upper temperature boundary value (Tsto) of about 60° C., said premature time period ($\Delta t$) corresponds to a doubled measuring time from said measuring value "m" where "m" equals 1.

20. An apparatus according to claim 15, wherein with said starting temperature (Tx) greater than said upper temperature boundary value (Tsto), said premature time period ($\Delta t$) corresponds to said time period (t2) from reaching said boiling temperature (Ts), up to reaching said measuring temperature (Tn).

* * * * *